United States Patent [19]

Kumano et al.

[11] Patent Number: 5,084,817
[45] Date of Patent: Jan. 28, 1992

[54] SYSTEM FOR TRANSLATING A LANGUAGE HAVING POLITE EXPRESSIONS

[75] Inventors: Akira Kumano; Shin-ya Amano, both of Yokohama; Hisahiro Adachi, Chigasaki; Hiroyasu Nogami, Yuokohama; Seiji Miike; Tsutomu Kawada, both of Yokohama; Kimihito Takeda, Odawara; Isamu Iwai; Miwako Doi, both of Kawasaki; Toshio Okamoto, Tokyo; Noriko Yamanaka, Fujisawa, all of Japan

[73] Assignee: Kabushiki Kaisha Toshiba, Kawasaki, Japan

[21] Appl. No.: 319,912

[22] Filed: Mar. 6, 1989

Related U.S. Application Data

[63] Continuation of Ser. No. 170,660, Mar. 14, 1988, abandoned, which is a continuation of Ser. No. 858,007, May 1, 1986, abandoned.

[30] Foreign Application Priority Data

May 7, 1985 [JP] Japan ................... 60-96322

[51] Int. Cl.$^5$ .................. G06F 7/24; G06F 15/38; G06F 15/40
[52] U.S. Cl. .................. 364/419; 364/226.4; 364/274.8; 364/282.1; 364/920.4; 364/943; 364/972.1; 364/974; 364/DIG. 1; 364/DIG 2; 395/800
[58] Field of Search ... 364/200 MS File, 900 MS File, 364/419

[56] References Cited

U.S. PATENT DOCUMENTS

| | | | |
|---|---|---|---|
| 4,393,460 | 7/1983 | Masuzawa et al. | 364/900 |
| 4,542,478 | 9/1985 | Hashimoto et al. | 364/900 |
| 4,586,160 | 4/1986 | Amano et al. | 364/900 |
| 4,597,055 | 6/1986 | Hashimoto et al. | 364/900 |
| 4,633,435 | 12/1986 | Morimoto et al. | 364/900 |
| 4,641,264 | 9/1987 | Nitta et al. | 364/900 |
| 4,730,270 | 3/1988 | Okajima et al. | 364/900 |

FOREIGN PATENT DOCUMENTS

| | | | |
|---|---|---|---|
| 0012777 | 9/1980 | European Pat. Off. | |
| 0138619 | 4/1985 | European Pat. Off. | |
| 0189665 | 6/1986 | European Pat. Off. | 364/419 |
| 58-192173 | 11/1983 | Japan | 364/419 |
| 58-217081 | 12/1983 | Japan | 364/900 |
| 2062916 | 5/1981 | United Kingdom | |

OTHER PUBLICATIONS

Information Processing, Proceedings of the IFIP Congress, Aug. 8–12, 1977 pp. 139–143, IFIP, North Holland Publishing Co., Amsterdam, NL; P. Dell'Orco et al.; "Using Knowledge of a Data Base World Interpreting Natural etc.".

Communications of the Association for Computing Machinery, vol. 25, No. 1, Jan. 1982, pp. 27–47, ACM, N.Y., U.S.; J. J. Robinson: "Diagram a Grammar for Dialogues".

*Primary Examiner*—Thomas C. Lee
*Assistant Examiner*—Ayni Mohamed
*Attorney, Agent, or Firm*—Oblon, Spivak, McClelland, Maier & Neustadt

[57] ABSTRACT

A language expression data base is adapted to store expression data of an input sentence of a first language to be translated into a second language and the expression data stored in the language expression data base is renewed under the control of an expression data input unit. An input basic form sentence structure data extracted from the input sentence of the first language is translated into a basic form sentence structure data of the second language at the sentence structure transfer unit. A basic form sentence of the second language is obtained on the basis of the basic form sentence structure data of which an expression is then modified according to the expression data stored in the language expression data base, and a modified sentence of the second language is displayed on a display through an output unit.

6 Claims, 7 Drawing Sheets

| 私は | 彼を | 連れて行きました。 |
|---|---|---|
| SUBJECT | OBJECT | VERB |
| JPS | JPO | JPV |

| ES | EV | EO |
|---|---|---|
| SUBJECT | VERB | OBJECT |
| I | carried | him. |

私は彼を連れて行きました。
I carried him.

FIG. 3E

連れて行く： (1) carry
         (2) go with
         (3) take
         (4) bring

FIG. 3F

I took him.

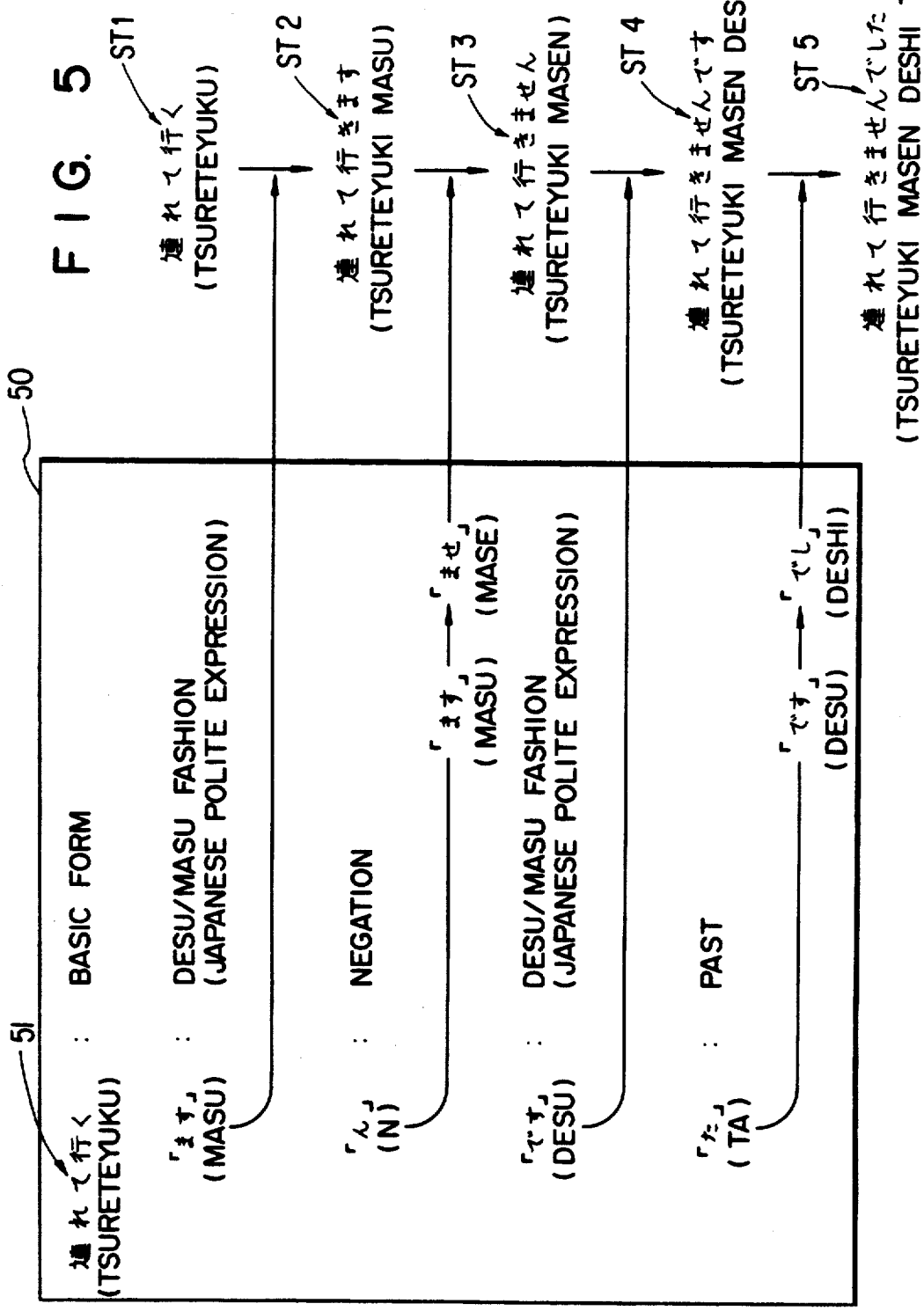

SYSTEM FOR TRANSLATING A LANGUAGE HAVING POLITE EXPRESSIONS

This application is a continuation of application Ser. No. 170,660, filed on Mar. 14, 1988, now abandoned, which is a continuation of application Ser. No. 858,007, filed on May 1, 1986, now abandoned.

BACKGROUND OF THE INVENTION

The present invention relates to a language forming system which modifies expressions in a basic form (e.g., words, i.e., nouns, verbs, and the like, or noun or adjective phrases) to form corresponding language expressions in a different form.

In a machine translation system, when an input sentence is translated into a sentence in another language, the translated sentence is sometimes inappropriate. For example, in a conventional sentence structure transfer method, when an operator judges that a translated sentence displayed on a display screen is inappropriate, he cancels the displayed translated sentence, and must restart the translating process, including sentence structure transfer in accordance with language data stored in a language data base, to obtain another translated output. This sentence structure transfer method is described in the text used during the Proceedings of the 8th International Conference on Computational Linguistics, Tokyo, Sept. 30–Oct. 4, 1980, on p. 414 and thereafter.

When a large number of translation alternatives are output as described above, if a satisfactorily translated sentence cannot be obtained, the content of the language data base must be renewed, and the whole process must be repeated to form an appropriately translated sentence.

However, this method applies considerable load to the operator. In addition, all the modifications of language expressions must be stored in the language data base, resulting in a bulky and impractical system.

SUMMARY OF THE INVENTION

It is an object of the present invention to provide a language forming system with high practical advantages, which effectively uses a data base for forming a given sentence, can easily obtain a polite expression in a desired form, and can greatly simplify an operation for obtaining the appropriate polite expression.

This and other objects are achieved according to the present invention by providing a novel language forming system wherein a language expression data base stores expression data of an input sentence of a first language to be translated into a second language and the expression data stored in the language expression data base is renewed under the control of an expression data input unit. An input basic form sentence structure data extracted from the input sentence of the first language is translated into a basic form sentence structure data of the second language at the sentence structure transfer unit. A basic form sentence of the second form sentence structure obtained on the basis of the basic form sentence structure data of which an expression is then modified by changing only a part of the sentence designated by an operator according to the expression data stored in the language expression data base, and a modified sentence of the second language is displayed on a display through an output unit.

The language expression data base stores common expression data for an entire sentence to be formed, input expression data set to correspond to a partial expression of an input sentence, expression modification/formation rule data, and the like. When a basic form of a certain language expression is input, attribute data stored in the language expression data base is selected accordingly, and the language expression in the basic form is modified in accordance with the attribute data.

In this way, the language expression data base stores attribute data for various expressions. When a certain expression is input in its basic form, a modified expression can be formed in accordance with the attribute data stored in the data base. When a sentence is to be processed, an output character string need not be modified by deletion or insertion, and a language expression which is modified to a desired expression can be easily obtained. When the attribute data stored in the data base is changed, expressions for all output sentences can be corrected systematically, and load on an operator can be greatly reduced.

BRIEF DESCRIPTION OF THE DRAWINGS

FIG. 3D shows a display in which a first translated sentence is displayed;

FIG. 3E shows translation candidates to be selected;

FIG. 3F shows an output translated sentence;

FIG. 5 is a chart showing an example of the expression modification processing.

DETAILED DESCRIPTION OF THE PREFERRED EMBODIMENT

Figure 1:
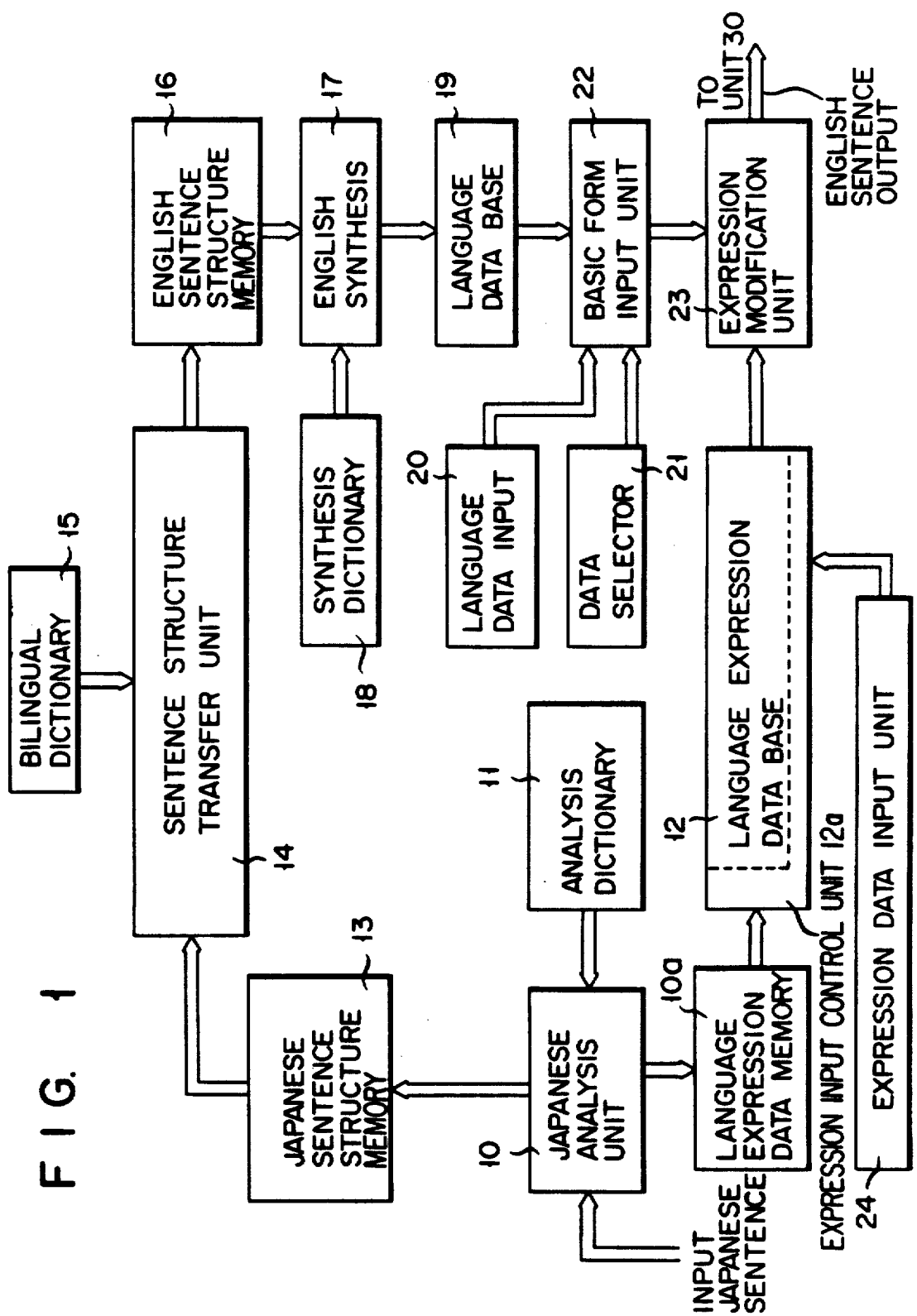
FIG. 1 is a block diagram of the arrangement of a machine translation system according to an embodiment of the present invention.

An embodiment of the present invention will be described in detail hereinafter, with reference to the accompanying drawings. FIG. 1 is a block diagram of a sentence-structure transfer type machine translation system to which the present invention is applied. A case will be exemplified wherein Japanese sentences are translated into English sentences. Referring to FIG. 1, input Japanese sentence data is supplied to Japanese analysis unit 10, which extracts Japanese sentence-structure data and various Japanese expression data. Japanese sentence analysis is performed with reference to Japanese analysis dictionary 11.

Figures 3A, 3B, 3C:
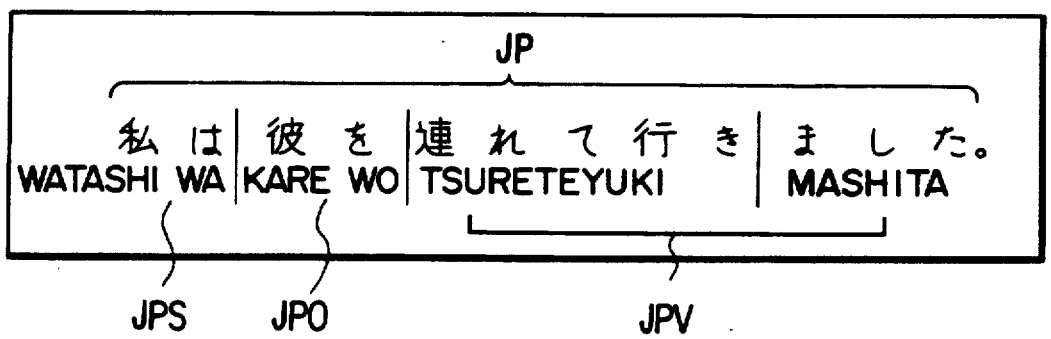
FIG. 3A shows an input Japanese sentence data.
FIG. 3B shows Japanese sentence structure data.
FIG. 3C shows a corresponding English sentence.

Assume that an input Japanese sentence is as shown in FIG. 3A. An appropriate translated sentence thereof is "I took him.". This sentence can be re-written in Roman characters as "Watashi wa kare wo tsurete yukimashita.".

The Japanese expression data extracted by unit 10 is data representing an inherent expression in each sentence, such as whether the input sentence is in the past, present, or future tense, or the like, and whether it is in an interrogative form, a negative form, or the like, and the resultant data is stored in language expression data base 12 through language expression data memory 10a.

Data base 12 also stores data representing an expression common to a plurality of sentences (e.g., polite expression data). As is well known, a Japanese sentense often includes a polite expression (e.g., ". . . desu.", ". . . masu.", or the like), which is added to the end of a sentence.

Generally speaking, data stored in data base 12 includes:

1. common language expression data for an entire sentence;
2. input language expression data for a part of an input sentence;
3. language expression modification rule data specifying an application range of the input language expression data; and
4. attribute data representing attributes associated with language expressions (e.g., conjugation rule data). Items 3 and 4 are outstanding characteristics of Japanese.

Unit 10 also extracts Japanese sentence-structure data, which is then supplied to sentence-structure transfer unit 14 through buffer memory 13 (used if necessary). Unit 14 forms English sentence-structure data corresponding to the input Japanese sentence-structure data with reference to bilingual dictionary 15.

The obtained English sentence-structure data is supplied to English synthesis circuit 17 through buffer memory 16 (used if necessary). Circuit 17 reads out the content of synthesis dictionary 18 on the basis of the input English sentence-structure data to obtain English sentence data in a basic form, which has a word order and sentence structure equivalent to that of the input Japanese sentence.

The English sentence data in the basic form is then supplied to one input terminal of basic form input unit 22 through language data base 19. Unit 22 is also coupled to the outputs from language data input unit 20 and data selector 21, both of which have keyboards. The output from unit 22 is, for example, a sentence "I carry him.", which is supplied to expression modification unit 23.

Expression data stored in data base 12 is read out and supplied to expression modification unit 23. Note that since the input Japanese sentence is in the past tense and in the affirmative form, data base 12 stores past-tense data and affirmative-form data as language expression data. Therefore, the basic sentence "I carry him." from unit 22 is modified based on the past and affirmative expression data from the data base 12, obtaining a modified English sentence "I carried him.". Note that polite English expressions include ". . . would like to . . . " and the like. The operator inputs this kind of expression data from expression data input unit 24 to data base 12. The basic English sentence "I carry him." can also be input by the operator through unit 20, instead of being obtained as a well known output from the sentence-structure transfer type machine translation system. The detailed structure and function of this system are described in the text of above-mentioned Conference.

Figure 1A:
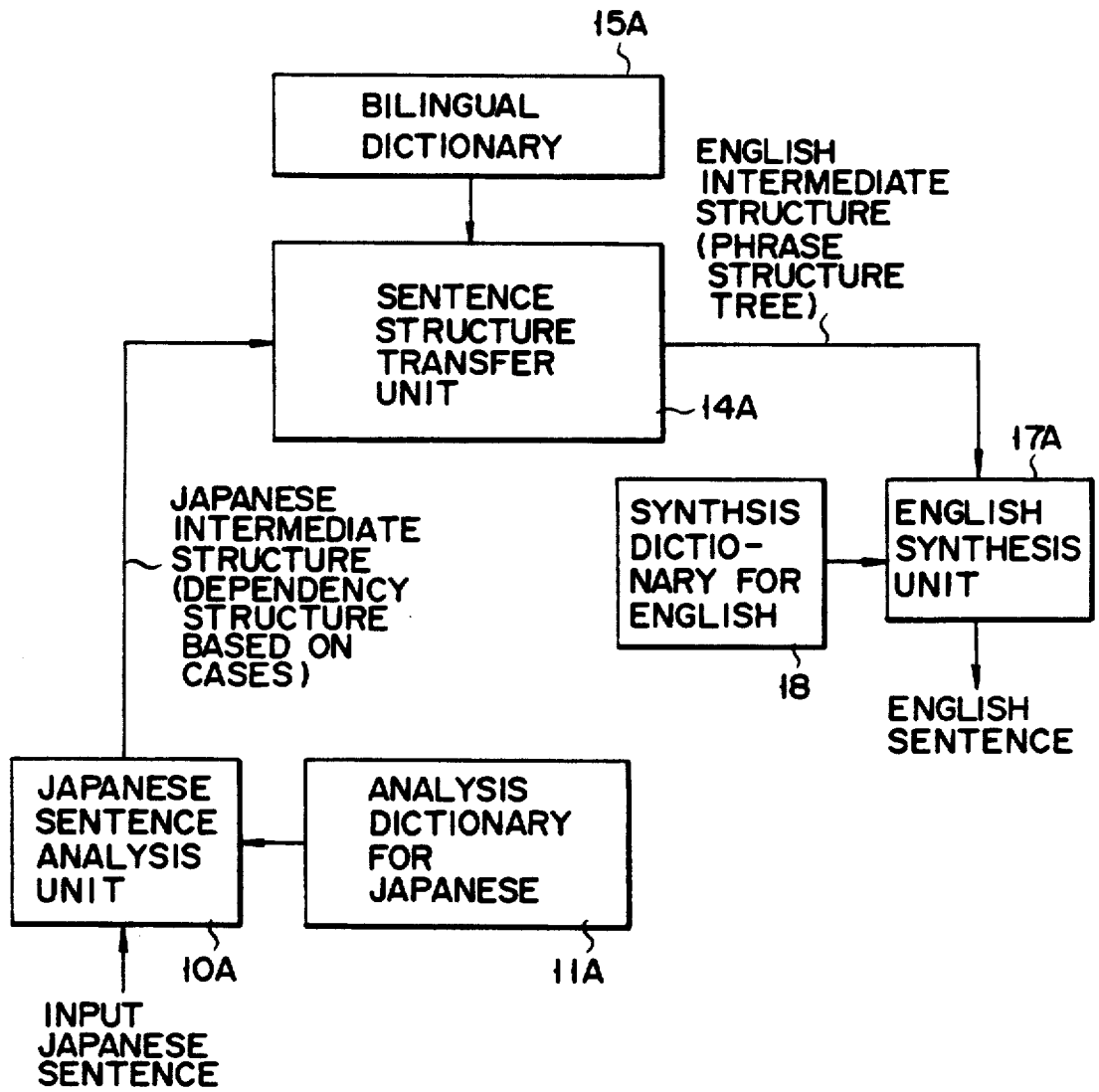
FIG. 1A is a block diagram of a prior art machine translation system.

In the text of the Conference, a machine translation system from japanese into English is described. The structure of the machine translation system is shown in FIG. 1A. The overall system includes three major components; Japanese analysis unit 10A, sentence structure transfer unit 14A, and English synthesis unit 17A. The system is based on several guiding principles. Among these, the following distinguishes the system of FIG. 1A from the conventional MT systems.

1. It is highly lexicon-driven. Every component of FIG. 1A including those 10A, 14A and 17A is highly dependent on lexical descriptions of individual words. In other words, most of the linguistic phenomena are treated by lexical descriptions and lexical rules, instead of general syntactic rules such as "structure dependent rules" in Chomskian grammar.

2. The approach becomes closer to the interlingual approach. Because japanese structures can be adequately captured by dependency structures based on case notations, this structure is adopted as the intermediate representation for Japanese. On the other hand, the structures from which synthesis of English will start are ordinary phrase structures. It is well known that dependency structures require semantically deeper analyses than usual phrase structures. Therefore, the system's approach becomes closer to the interlingual approach, and even indistinguishable with it in some cases. Especially, because the two languages have quite different systems for expressing tenses, modals, aspects, etc., these expressions are analyzed into much deeper levels, that is, almost the interlingual level. Considering the fact that the two languages belong to quite different language families, the system's approach seems to be inevitable.

Now, the functions of the elements in FIG. 1A will be described in detail.

1. Japanese sentence analysis unit 10A:

The analysis in unit 10A proceeds as follows:

1-1. morphological analysis
1-2. segmentation of an input sentence into a set of simple sentence fragments (each fragment contains only one predicative term such as verb, predicative adjective, copula, etc.)
1-3. recognition of relationships among sentence fragments
1-4. noun phrase analysis
1-5. simple sentence analysis (1-4 and 1-5 are performed intermixedly.

Because Japanese is a typical agglutinative language, many useful sorts of information can be obtained by morphological analysis. It is undoubtedly true in both cases, Japanese analysis and other European language analysis, typically in English analysis, that morphological and syntactic analysis should work cooperatively. However, the cooperation should be done in different ways. Generally speaking, English morphological analysis needs much help from its syntactic analysis. English homograms can rarely be resolved by intraword processing. Therefore, morphological analysis alone will produce highly ambiguous results in English. Syntactic and even semantic information is required to resolve them. On the contrary, Japanese morphological analysis offers much help to its syntactic analysis. This implies that Japanese morphological analysis can be done in a separate phase with syntactic and other succeeding processing.

At the second step 1-2 of the analysis, the segmentation step, the input sentence is divided into several sentence fragments so that each of them contains only one predicative term. At the same time, post-verbal suffixes which follow the predicative terms are processed, and the appropriate markers of tenses, modals, and voices are selected.

The third step 1-3 is to recognize the global structure of the input sentence. The relative clauses, clefted sentences, conjunctions of sentences etc. are recognized at this step, by utilizing the inflection information of each predictive term in the sentence. Generally speaking, several numbers of global structures are produced for an input sentence. The global structure is represented by a tree called GPT (Global Plan Tree), which guides the succeeding analysis. That is, a node of GPT indicates what kind of transformed patterns should be used to analyze the corresponding fragment, and what in order.

2. Sentence structure transfer unit 14A:

The transfer is also guided by a lexicon as the analysis procedure is bilingual dictionary. There will now be described first the two structures over which the transfer phase bridges, i.e., intermediate structures for Japanese and English.

2-1. Japanese intermediate structures (JIS):

Japanese intermediate structures produced by the analysis unit 10A are basically dependency structures of input sentences, based on case notions. As a usual dependency structure, each node is not labeled by a category symbol like NP, VP, PP, etc., but by a word. The word attached to a node is an intermediate word which has a unique entry in the bilingual dictionary. It may happen that a single Japanese surface word corresponds to multiple entries in the bilingual dictionary. In these cases, the disambiguation among them is to be done during the analysis phase. However, it may also happen that, during the transfer phase, a single intermediate word should be mapped into several different English words.

2-2. English intermediate structure (EIS):

The EIS's are similar to conventional phrase structure. The maim difference is that each node in the tree is characterized not only by a category symbol like S, NP, VP, etc., but also by a set of attribute-value pairs. EIS plays almost the same roll of 'starting phrase structure' in Chomsky. Successive transformations are applied cyclically on the structure during the English synthesis. However, the transformation component in FIG. 1A system includes a set of rules which are not 'structure depend'and, therefore, not considered as 'transformation' in TG's sense. For example, passivated constructions are generated not through transformation in Chomsky's current framework, but they are considered as base-generated. In FIG. 1A system, however, they should be treated during English synthesis phase, whether they are structure dependent or not. The main purpose of transformations in the English synthesis is to generate adequate English surface structures from 'Japanese-generated' structures, instead of 'base-generated' ones. Passivation transformation, for example, is indispensable in FIG. 1A system, because it is common in Japanese to state sentences in active voice without any agents. In order to support such transformations, information other than syntactic categories and structures is necessary.

2-3. The transfer procedure:

The general algorithm for the transfer phase changes a given JIS into the corresponding EIS by 'evaluating' the nodes in the JIS recursively. A transfer procedure usually works as follows: (1) A transfer procedure defined for a governing word (verb, relation-descriptor, etc.) will invoke the main program in order to transfer the JIS substructure governed by the current node.

(2) When these substructure transfers are completed, the transfer procedure attached to the governing node will arrange the substructures (in EIS) into single structures and return them to the higher level. Because transfer procedures at the lower level generally return several possible EIS structures, the procedure at the higher level selects feasible combinations and returns them in parallel, if several combinations are feasible.

(3) A transfer procedure for a dependent word (typically noun) will not invoke the main program, but only choose the appropriate English equivalents. So the recursive process terminates.

Notice that the whole process is highly lexicon driven. Because the main program only checks the preconditions and invokes transfer procedures defined in the dictionary, the transfer step can easily changed by adding new descriptions in the dictionary.

3. English synthesis unit 17A:

Because an EIS is generated directly rom the corresponding JIS, it preserves many characteristics of Japanese syntax. In this sense, it is 'Japanese-generated' but not 'base-generated'. This structure should be transformed to obtain a correct English syntactic structure. Japanese 'wh' questions, for example, are stated in the forms similar to their declarative ones, except that wh-words are marked by special prefix words. The wh-movement rule is undoubtedly necessary to produce correct English sentences.

3-1. The generation dictionary:

At the first step of the generation, the system retrieves the lexical description of each word in the EIS from the generation dictionary. It contains not only trivial indicators necessary for morphological synthesis, but also some other indicators which are examined during the transformation process as follows:

3-2. Transformation rule:

A transformation rule is essentially a tree-to-tree mapping expressed by MP—MP. Each rule is specified as either obligatory (OB) or optional (OP). OB means that the rule is obligatory (if the rule is applicable, it should be applied). If a rule is marked as OP, it may or may not be applied.

The applicability of a rule is checked not only by pattern-matching but also by user-defined checking procedures specified in BPL. Because an MP (matching pattern which shows the tree scheme on which the rule is to be applied) contains several variables and the pattern-matching between MP and the current tree structural binds the variables to appropriate substructures, these user-defined procedures can investigate the relationships between substructures in arbitrary ways, including attribute checkings, by utilizing this variable binding.

Figure 2:
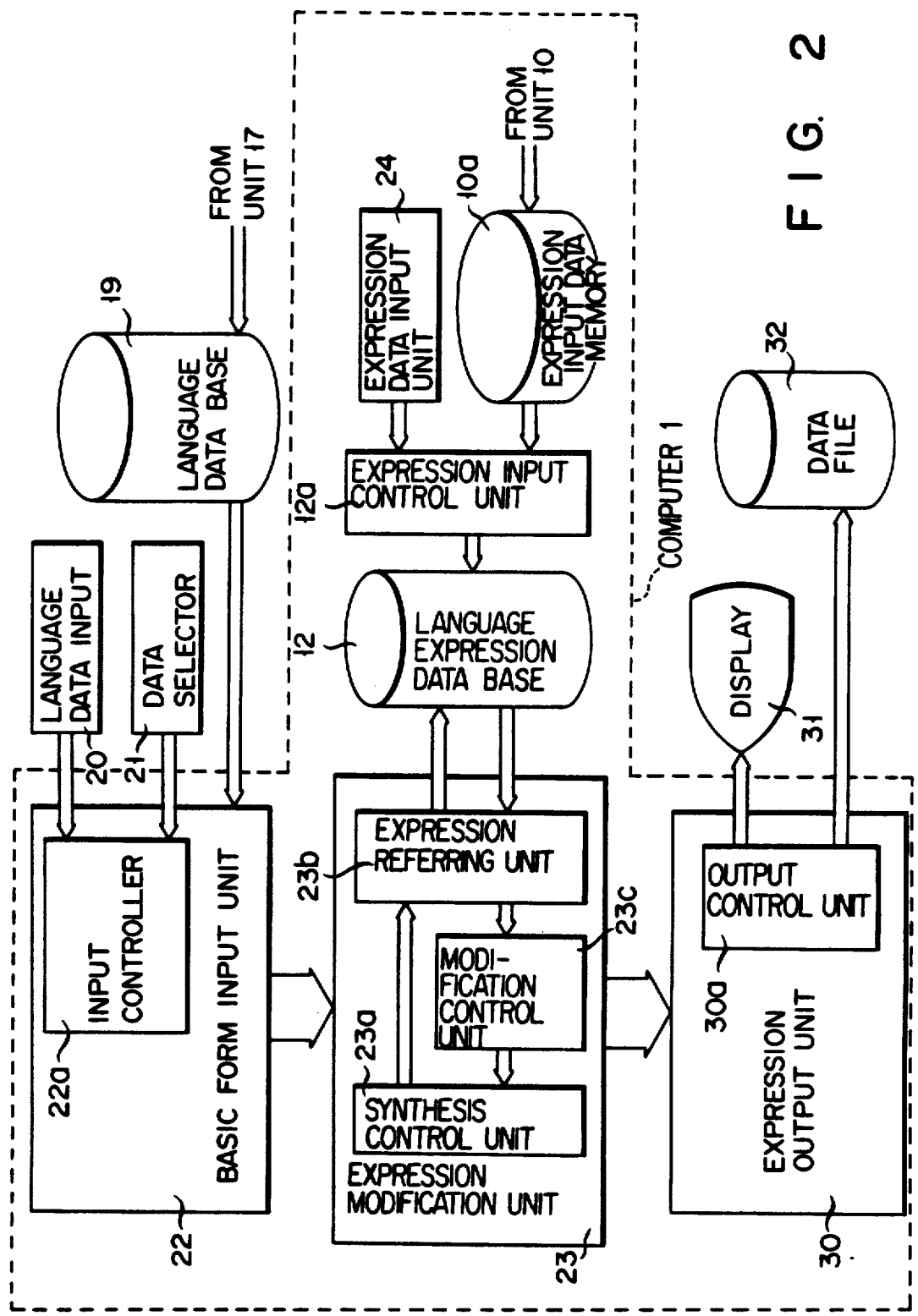
FIG. 2 is a block diagram of a detailed arrangement of a main part of FIG. 1.

FIG. 2 shows the main part of the system computer implemented in FIG. 1, in more detail. The same reference numerals in FIG. 2 denote the same parts as in FIG. 1. Referring to FIG. 2, unit 20 reference numeral 1 designates the computer by which the present system is implemented. Unit 20 is used for manually inputting English basic form data through a keyboard or the like. Data selector 21 selects basic form data stored in language data base 19 controller 22a.

English basic form data is supplied from unit 22 to expression modification unit 23. Unit 23 mainly comprises synthesis control unit 23a, and refers to expression referring unit 23b so as to extract attribute data stored in data base 12. The extracted attribute 20 data is supplied to modification control unit 23c, to modify corresponding expressions in the basic form data.

Data base 12 includes expression input control unit 12a. Data from unit 24 with a keyboard and language expression data from unit 10 are input to data base 12 through expression input data memory 10a and control unit 12a.

The modified English sentence data output from unit 23 is supplied to expression output unit 30. Unit 30 has output control unit 30a, which supplies output data to display 31 or data file 32.

The operation of the system according to the embodiment in FIGS. 1 and 2 will be described in detail with reference to FIGS. 3A to 3F, 4, and 5.

Input Japanese sentence data JP shown in FIG. 3A corresponding to an English sentence "I took him." is supplied to unit 10 in FIG. 1. Unit 10 extracts the past-tense and affirmative expression data from the input data, and stores it in data base 12. Unit 10 also extracts Japanese sentence-structure data JPS-JPO-SPV shown in FIG. 3B, and supplies it from memory 13 to transfer unit 14. Unit 14 transfers the Japanese sentence-structure data in FIG. 3B to the English sentence-structure data shown in FIG. 3C, with reference to bilingual dictionary 15. Note that FIG. 3C shows an English sentence EN for easy understanding. However, actual data simply indicates a sentence structure ES-EV-EO. The output from unit 14 is stored in memory 16. First translated-sentence data is then displayed on display 31, as shown, in FIG. 3D, through units 17, 19, 22, and 23, in accordance with the sentence-structure data stored in memory 16. The displayed, translated sentence data is then checked by the operator.

If the operator judges that a part of the sentence EN in FIG. 3D (e.g., the verb "carried") is inappropriate, he moves cursor 35 to a position under the word "carried" and instructs correction of this word using, e.g., a function key on the keyboard of data selector 21. As a result, the input and output sentences are displayed on display 31 while cursors 35 and 36 are displayed to a position under their corresponding portions, as shown in FIG. 3D.

When the function key of selector 21 is depressed, translation candidates (1)–(4) corresponding to the Japanese verb indicated by cursor 36 are read out from data base 19 under the control of unit 22a, and are displayed in their infinitive form, as shown in FIG. 3E. The operator selects the verb "take" from the displayed candidates, and indicates it with cursor 37. The selected verb "take" is then supplied to unit 22, and the basic form sentence "I carry him." is modified to a new basic form sentence "I take him." The modified basic sentence is supplied to unit 23, and is modified based on the past-tense and affirmative expression data stored in data base 12, thus forming the output sentence 38 shown in FIG. 3F.

In the above descriptions, "past-tense" and "affirmative form" data are extracted as expression data and stored in data base 12 following analysis of the input Japanese sentence. Next, respective words or phrases of the basic form sentence are modified based on the expression data. If an interrogative sentence is input in the present tense, for example, expression data stored in data base 12 is updated or renewed as "present-tense" and "interrogative form" data. In addition, an expression ". . . would like to . . . " can be stored in data base 12 through input unit 24, and can be used for sentence modification by unit 23, thus obtaining a sentence, "I would like to take him."

Figure 4:
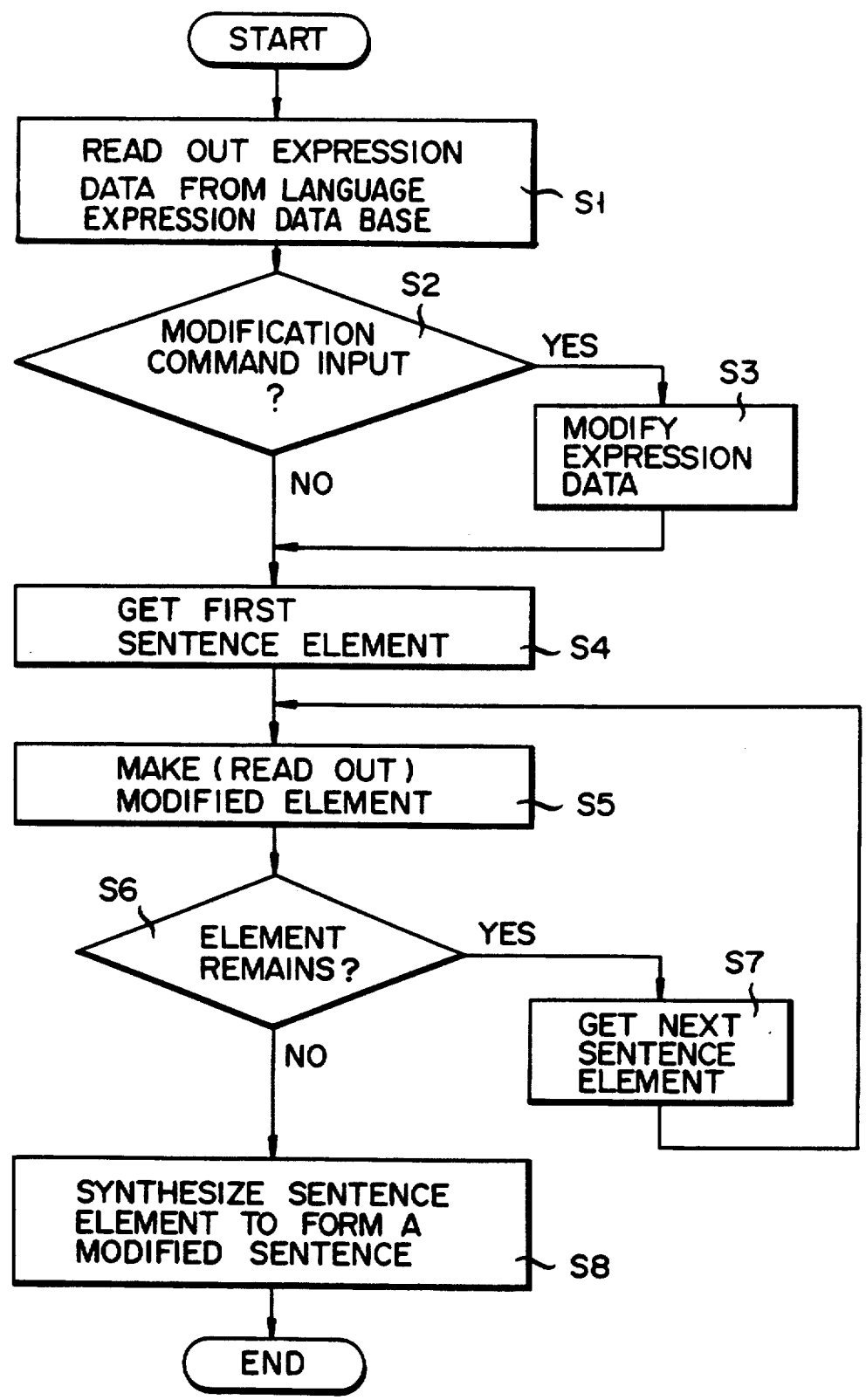
FIG. 4 is a flow chart of expression modification processing.

FIG. 4 is a flow chart showing the operation of unit 23 in FIG. 2.

First, an expression data is read out from data base 12 in step S1. The flow advances to step S2 for checking if a modification command is input. If YES in step S2, the read out expression data is modified in step S3. If NO in step S2, the flow advances to step S4 where a first sentence element in the sentence data stored in basic form input unit 22 is gotten. The gotten sentence element is supplied to expression modification unit 23 to make or read out a modified element based on the expression data read from unit 12 in step S5.

The flow advances to step S6 for checking if any element remains. If YES in step S6, the flow advances to step S7 where a next sentence element is gotten which is then modified in step S5. If NO in step S6, the flow advances to step S8 where all the modified sentence elements are synthesized to form a modified complete sentence.

The above operation is performed for all the sentence elements to be modified in accordance with the word order determined by English synthesis unit 17. In this case, only the operation for modifying the word "carry" to "carried" is performed. As previously described, since the operator inputs an instruction to replace the word "carry" with "take", YES is obtained in step S2, and the flow advances to step S3. The word "take" is read out from data base 19 under the control of selector 21, and the word "took" is obtained through steps S4 to S5 in the manner as described above.

The sentence elements including the modified word "took" are synthesized in step S8, thus obtaining the output sentence shown in FIG. 3F.

According to the present invention as described above, elements of an input basic sentence can be modified in accordance with expression data stored in an expression data base to easily obtain an output translated sentence with a desired expression, without storing language data for all expression forms in a language data base. Since expression data includes expression common to some sentences, the expression data base can be simplified, and data stored therein can be used effectively.

In the above embodiment, an output sentence with a desired expression is obtained using basic form and expression data obtained in the sentence-structure transfer type machine translation system. The basic form data supplied to unit 23 can also be obtained from other machine translation systems (e.g., a PIVOT type system).

For example, an input sentence to be translated is supplied to unit 23 as basic form data, to obtain a modified sentence in accordance with expression data stored in data base 12.

Alternatively, after the verb "take" in a sentence input from unit 20, for example, is replaced with "get", the modified sentence can be input to unit 23 as a basic form sentence. An input expression is not limited to sentences, but can be words, phrases, or clauses.

In the above embodiment, a dictionary form or the infinitive form is used as a basic form, but the present tense, for example, can also be used.

FIG. 5 is a chart showing the operation of the embodiment of the present invention when a sentence "I didn't take him." is translated into a corresponding Japanese sentence in a manner opposite to the above embodiment. Referring to FIG. 5, the portion 50 surrounded by solid lines shows a process for modifying basic form language 51 with attribute expression data. Information 52, outside the solid-line block shows that translated sentences S1-S5 having various meanings can be obtained through expression modification processing.

What is claimed is:

1. A computer-implemented language forming system comprising:

means for electronically analyzing an input sentence of a first language to be translated into an output sentence of a second language to extract first sentence structure data of the input sentence and attribute data including past expression data and negative expression data;

means for inputting polite expression data;

means connected to receive the attribute data extracted from the analyzing means and the polite expression data for storing the attribute data and polite expression data;

means connected to receive the first sentence structure data for transferring the extracted first sentence structure data into a second sentence structure data for the output sentence of the second language;

means connected to receive the second sentence structure data for synthesizing the translated basic output sentence of the second language based on the second sentence structure data;

means connected to receive the translated basic output sentence of the second language for displaying the same in a visible form;

means for indicating a part of the displayed translated basic output sentence of the second language which is to be changed with an appropriate expression;

means for displaying simultaneously all translation candidates in root forms corresponding to the indicated part of the displayed second language sentence;

means for selecting one of the displayed translation candidates in each root form so as to obtain the output sentence of the second language having a selected translation candidate; and expression modification means for modifying a polite expression obtained output sentence of the second language using the polite expression data stored in the storing means.

2. A system according to claim 1, wherein the input sentence is a simple sentence; and the attribute data stored in said storing means includes:

common expression data for the simple sentence;

input language expression data for a predetermined element constituting the simple sentence;

language expression modification rule data for specifying an application range of the input language expression data; and conjugation rule data of a language expression of the simple sentence.

3. A system according to claim 1, wherein the first sentence structure data including verb data of an infinitive form of a verb.

4. A system according to claim 1, wherein said synthesizing means includes a language data base for storing a plurality of basic form sentence data of the second language, and means for selectively supplying one of said basic form sentence data stored in said language data base.

5. A system according to claim 1, which further comprises means for inputting basic sentence data of the second language to be supplied to said displaying means.

6. A system according to claim 1, wherein said first language is Japanese and said second language is English.

* * * * *